United States Patent [19]

Stahl

[11] 4,384,546
[45] May 24, 1983

[54] DEVICE FOR CLEANING A FILTER USED IN CONJUNCTION WITH A GALVANIZING PROCESS

[75] Inventor: Robert M. Stahl, Toledo, Ohio

[73] Assignee: Midland-Ross Corporation, Cleveland, Ohio

[21] Appl. No.: 325,332

[22] Filed: Nov. 27, 1981

[51] Int. Cl.³ .................. B05B 1/28; B01D 46/04
[52] U.S. Cl. .................. 118/699; 118/312; 118/603; 427/192; 55/273; 55/287; 55/294; 55/302; 55/385 R; 55/DIG. 39
[58] Field of Search .......... 55/273, 283, 284–288, 55/302, 350, 294, 385 R, DIG. 46; 118/312, 603, 699; 427/192

[56] References Cited

U.S. PATENT DOCUMENTS

| | | | |
|---|---|---|---|
| 2,500,123 | 3/1950 | Gwaltney et al. | 55/290 |
| 2,844,216 | 7/1958 | Swanson | 55/287 |
| 2,974,748 | 3/1961 | Swanson | 55/287 |
| 2,976,953 | 3/1961 | Haas et al. | 55/294 |
| 3,277,633 | 10/1966 | Smoot | 55/302 |
| 3,325,978 | 6/1967 | Rymer et al. | 55/294 |
| 3,388,534 | 6/1968 | Jensen | 55/269 |
| 3,487,609 | 1/1970 | Caplan | 55/96 |
| 3,616,614 | 11/1971 | Eisenegger | 55/294 |
| 3,648,442 | 3/1972 | Bourne | 55/294 |
| 3,793,811 | 2/1974 | Bourne | 55/294 |
| 3,813,853 | 6/1974 | Anderson | 55/283 |
| 3,854,910 | 12/1974 | Hammerquist | 55/287 |
| 3,861,893 | 1/1975 | Smith et al. | 55/302 |
| 3,871,845 | 3/1975 | Clarke et al. | 55/287 |
| 3,951,627 | 4/1976 | Barr, Jr. et al. | 55/284 |
| 4,022,595 | 5/1977 | Noland | 55/273 |
| 4,111,154 | 9/1978 | Kissel et al. | 118/312 |
| 4,154,589 | 5/1979 | Crawford et al. | 55/294 |
| 4,157,899 | 6/1979 | Wheaton | 55/273 |
| 4,220,457 | 9/1980 | Frediksen | 55/273 |
| 4,233,041 | 11/1980 | Noland | 55/287 |
| 4,299,597 | 11/1981 | Oetiker et al. | 55/273 |

*Primary Examiner*—David L. Lacey
*Attorney, Agent, or Firm*—H. Duane Switzer

[57] ABSTRACT

A device is described for filtering zinc powder from an airstream which is exhausted from a galvanizing process. The device comprises an enclosed chamber to which the airstream is circulated for removal of zinc powder. The chamber has a horizontally disposed bottom surface in which there is a plurality of circular openings which are equally spaced about a vertical center axis and which lead to vertically disposed bag-type filters. An arm is coupled to a vertical drive shaft which is rotatable about the center axis. The arm is designed to move a circular cover from opening-to-opening to individually seal the openings from the chamber, so that the filters can be cleaned of zinc powder. The cover is freely mounted on the distal end of the arm such that the cover is supported on the bottom surface of the chamber as it moves in an arcuate pathway between the filter openings.

10 Claims, 4 Drawing Figures

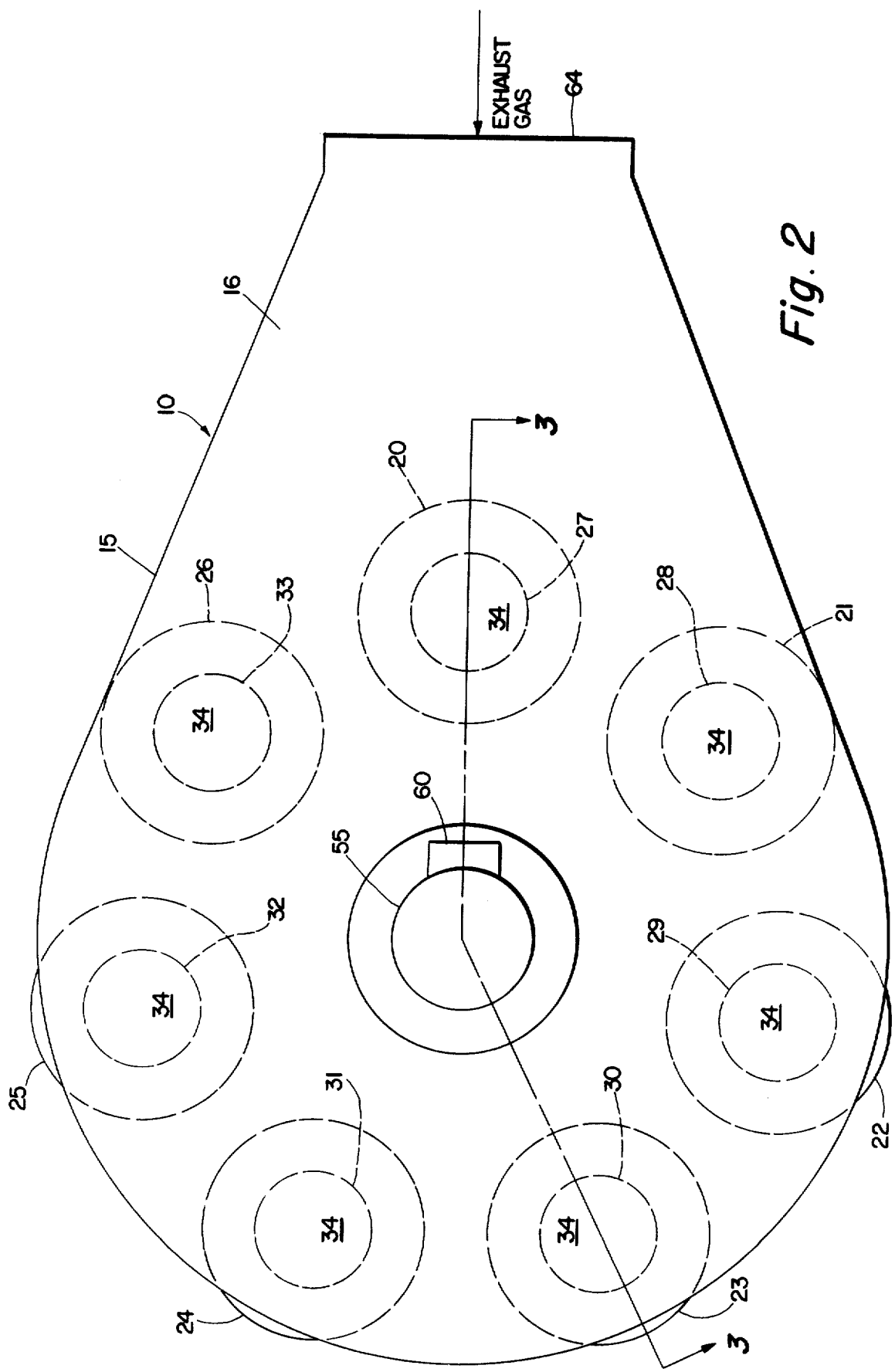

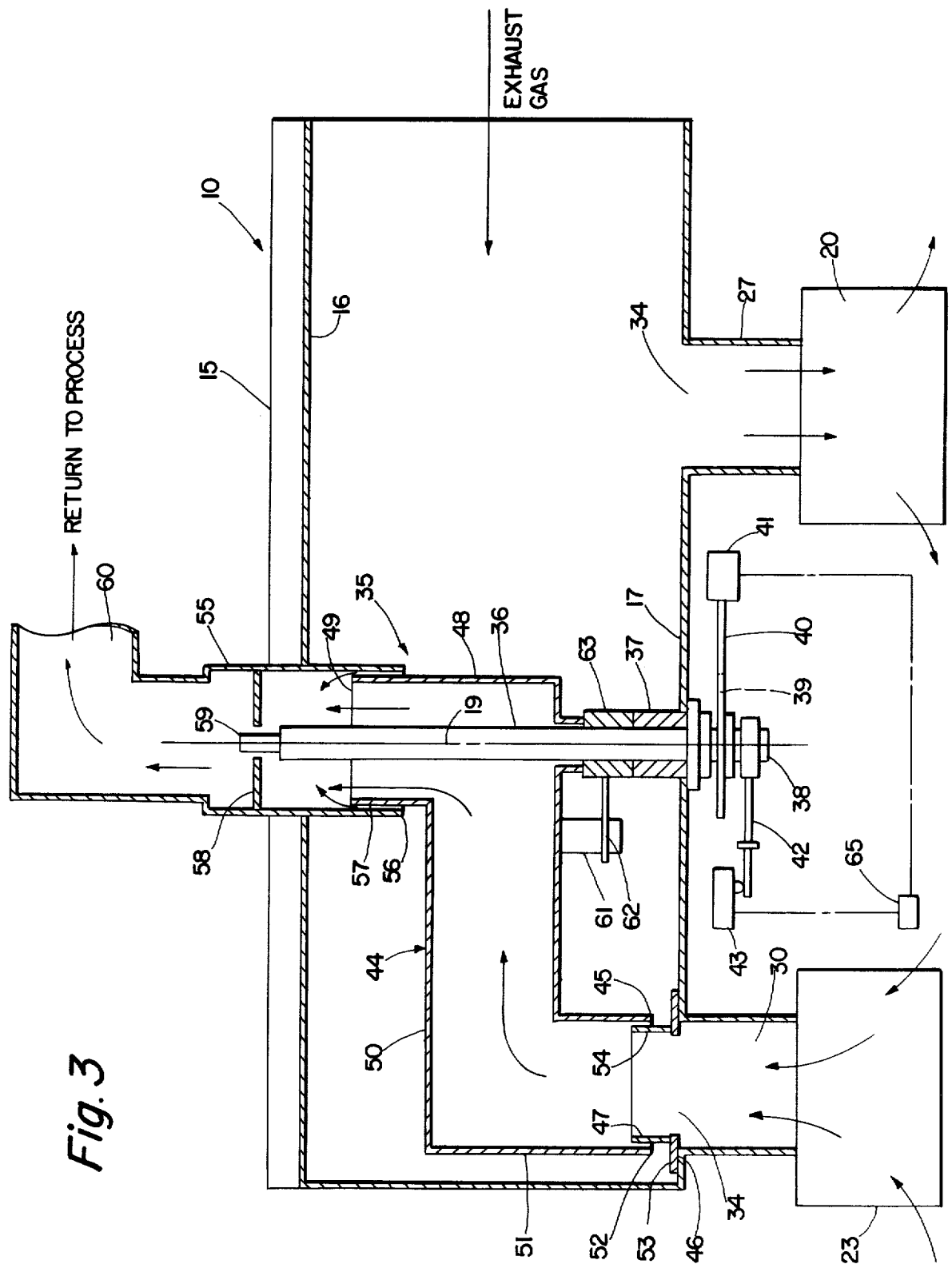

DEVICE FOR CLEANING A FILTER USED IN CONJUNCTION WITH A GALVANIZING PROCESS

BACKGROUND OF THE INVENTION

The invention is particularly well suited for use in a galvanizing process which uses powderized zinc for contacting a strip of metal that has been freshly dipped in a bath of liquid zinc. In such processes, it is important to remove the fine zinc dust or powder from the gas being exhausted from the process into the ambient atmosphere, since the dust contaminates the atmosphere and zinc powder is wasted. Therefore, the powder laden exhaust gas is circulated through filters which remove the zinc powder, prior to discharging the exhaust gas into the ambient atmosphere. Such filters become clogged with zinc powder, if they are not periodically cleaned. The invention is directed to an improved device for cleaning filters shown, for example, in U.S. Pat. No. 4,233,041 which relates to the backflushing of filters with air.

Briefly stated, the invention is in a filtering device for removing finely powderized material from a stream of gas. The device comprises a closed chamber which has a vertically disposed axis about which are equally spaced a plurality of filters which have identical openings that are in a horizontally disposed bottom wall of the chamber. Means are provided for removing filtered gas from the device. Means are supplied for cleaning the filters, including a drive shaft that is coincidental with the vertical axis of the chamber and an arm which is coupled to the drive shaft for unitary rotation about the vertical axis of the chamber, the arm extending in a radial direction from the drive shaft and terminating at a free distal end which is designed to arcuately move a cover from opening-to-opening, the cover being dimensioned to individually cover and seal each opening from the chamber. The cover has a vertically extending member which is freely mounted on the distal end of the arm for movement in at least a vertical direction, so that the cover is slidably supported on the bottom wall of the chamber. Means are included for rotating the drive shaft and arm about the vertical axis of the chamber, whereby the cover is moved from opening-to-opening, so that the filters can be successively cleaned of the finely powderized material.

DESCRIPTION OF THE DRAWING

The following description of the invention will be better understood by having reference to the accompanying drawing wherein:

FIG. 2 is a plan view of a filtering device that is used in the process of FIG. 1, and which employs the filter cleaning device of the invention;

FIG. 3 is a section of the filtering device, viewed from line 3—3 of FIG. 2.

ENVIRONMENT OF THE INVENTION

Figure 1:
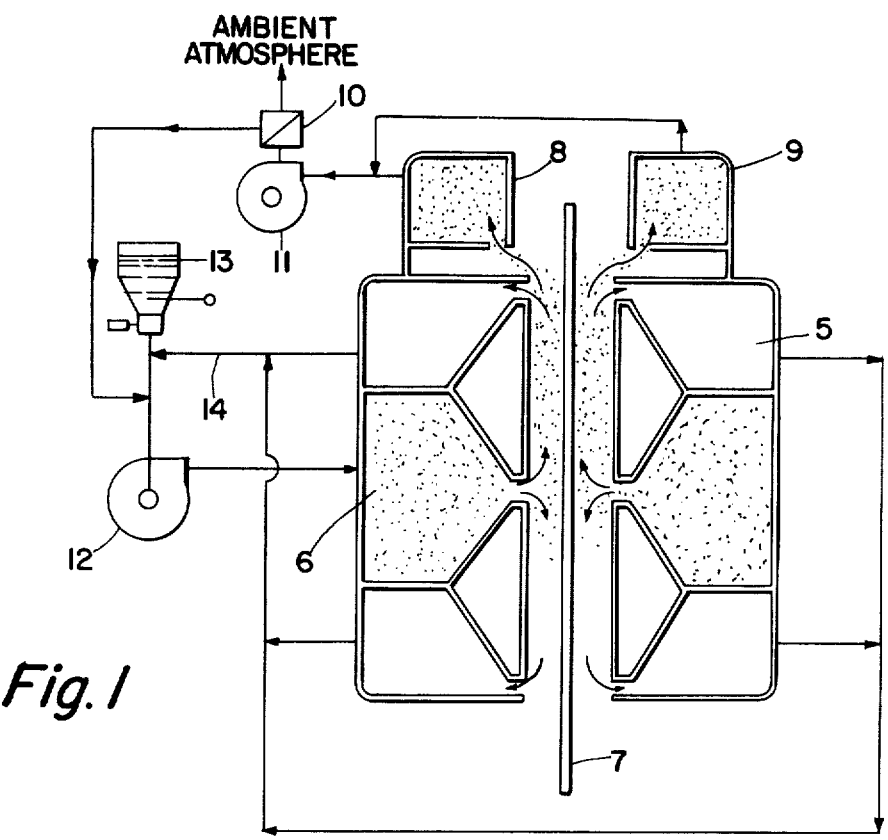
FIG. 1 is a schematic drawing of a galvanizing process which utilizes finely powderized zinc material.

With general reference to the drawing for like parts, and particular reference to FIG. 1, there is shown an apparatus 5 which is used to impinge finely powderized zinc material 6 against opposing sides of a strip of metal 7 that has been conventionally, freshly coated with liquid zinc. The excess gas, e.g. air, from the process contains zinc dust or powder, and is removed from exhaust hoods 8, 9 to a filtering device 10 by means of an exhaust blower 11. The zinc powder is removed from the exhaust gas in the filtering device 10, prior to discharging the gas into the ambient atmosphere. The zinc powder is then removed from the filtering device 10 and recirculated back to the apparatus 5 by means of a blower 12. As it is recycled to the apparatus 5, the used zinc powder from the filtering device 10, is mixed with unused zinc powder from a storage hopper 13 and used zinc powder which is removed directly from the apparatus 5 in a stream of gas via a piping arrangement 14.

The filtering device 10, as best seen in FIGS. 2 and 3, comprises a housing 15 that has horizontally disposed top and bottom walls 16, 17 between which is defined a chamber 18 that is sealed from the ambient atmosphere. The chamber 18 has a tennis racket-like configuration, including a cylindrical area having a vertically disposed center axis, indicated at 19. A plurality of conventional bag-type filters 20–26 are equally spaced about the center axis 19 of the chamber 18 for removing the zinc dust or powder from the exhaust gas being circulated to the chamber 18 for subsequent passage through the filters 20–26 which may be of any conventional design. The filters 20–26 are suspended in the ambient atmosphere from hollow cylinders 27–33 which have identical circular openings 34 that are flush with the bottom wall 17 and exposed to the chamber 18, the openings 34 having center axes which are parallel with, and equally radially spaced from, the center axis 19 of the chamber 18. Means 35 are provided for successively cleaning the filters 20–26 periodically, so that they will not become clogged with zinc powder.

THE INVENTION

The filter cleaning means 35, comprises an elongated drive shaft 36 which is vertically disposed in the chamber 18. The drive shaft 36 is concentrically mounted for rotation about the center axis 19 of the chamber 18 by any suitable means e.g. center bearing 37. The drive shaft 36 extends through the bottom wall 17 of the chamber 18 and terminates at a protruding end 38 on which a sprocket wheel 39 is concentrically mounted. The drive shaft 36 and attached sprocket wheel 39 are rotated by means of a drive belt or chain 40 that is operatively connected to any suitable motor 41. A sensing finger or handle 42 is also mounted on the protruding end 38 for unitary rotation with the drive shaft 36, the sensing finger 42 being designed to engage similar contacts 43 that are positioned adjacent each of the filters 20–26.

An arm 44 is coupled to the drive shaft 36 for unitary rotation by a suitable means, as will hereinafter be more fully explained. The arm 44 extends from the drive shaft 36 in the same radial direction as does the handle 42 and terminates at a distal end 45 which is designed to engage and arcuately move a free-floating cover 46 for individually covering and sealing the openings 34 of the filters 20–26 from the chamber 18 to prevent zinc laden exhaust gas from entering the covered filter, so that the filter can be manually removed for cleaning, or cleaned, in place, by backflushing with air. The cover 46 is free-floating in that it has a vertically extending member 47 which is freely supported in the distal end 45 of the arm 44, so that the cover 46 is supported by the bottom wall 17 of the chamber 18 as it slides across the bottom wall in response to rotation of the arm 44.

In the embodiment of FIGS. 2 and 3, the arm 44 comprises, a first hollow pipe 48 which concentrically surrounds the shaft 36 and has an upwardly facing open end 49 and a downwardly facing open end which is connected with a second hollow pipe 50 that is horizontally disposed and extends in a radial direction from the drive shaft 36. The arm 44 includes a third hollow pipe 51 which is connected to the second pipe 50 and extends downwardly in a vertical direction and terminates at an open end 52 which is closely spaced to the bottom wall 17 and plane of the openings 34 of the filters 20-26. The open end 52 of the third pipe 51 coincides with the distal end 45 of the arm 44. The cover 46, in this case comprises a planar, annular flange 53 which has an outside diameter that is larger than the diameter of a filter opening 34 and an inside diameter which is less than the diameter of a filter opening 34, so that zinc powder will not build up on the bottom wall 17 adjacent the filter openings as zinc powder is backflushed by air from the filters 20-26. The vertically disposed member 47 of the cover 46, in this instance, comprises a cylindrical collar 54 which is dimensioned to fit loosely within the open end 52 of the third pipe 51. Thus, it can be appreciated that the cover 46 is free to literally float over the bottom wall 17 of the chamber 18 as the arm 44 is rotated.

A fourth hollow standpipe 55 is secured to the housing 15 in vertical relation and extends into the chamber 18. The standpipe 55 is concentric with the drive shaft 36 and has an open end 56 which surrounds the adjacent open end 49 of the first pipe 48 of the arm 44. The standpipe 55 has an inside diameter which is slightly larger than the outside diameter of the first pipe 48 so that air is free to circulate upwardly into the fourth pipe 55 between the annular space 57 formed between the two pipes.

A spider-like bushing 58 is disposed in the standpipe 55 for coaction with the vertically uppermost, cylindrical end 59 of the drive shaft 36 to help maintain the drive shaft 36 in a vertical position. A fluid outlet 60 is provided in the standpipe 55 exteriorly of the housing 17.

The means for coupling the arm 44 and drive shaft 36 together for unitary rotation includes a downwardly extending tab 61 which is secured to the second pipe 50 and interlockingly engages a horizontally disposed pivot pin 62 which is keyed for unitary rotation to the drive shaft 36 by means of a collar 63 which is fastened to the drive shaft 36 and designed to rotatably support the pipes 48, 50, 51 of the arm 44.

In operation, exhaust gas, laden with zinc dust or powder from the galvanizing process, is removed from the exhaust hoods 8, 9 and circulated to the chamber 18 of the filtering device 10 through a fluid inlet 64 in the housing 15. The exhaust gas passes downwardly through the filters 20-26 where the zinc powder is removed for recirculation back to the process, as shown in FIG. 1. The filtered gas exits the filters 20-26 into the ambient atmosphere. The filter cleaning device 35 is simultaneously operated, because of the speed of the process and consequently accumulation of zinc powder in the filters 20-26. Assuming that a filter has just been cleaned, the motor 41 is actuated to rotate the drive shaft 36 and attached arm 44 until the cover 46 seals the next arcuately spaced opening of the next filter from the chamber 18 and the sensing finger 42 engages the contact 43 adjacent the next filter to stop operation of the motor 41 and consequent rotation of the arm 44. The contacts 43, when engaged, are designed to operate a timer 65 which, after a desired period of time sufficient to clean the filter has lapsed, actuates operation of the motor 41 to move the cover 46 to the next succeeding arcuately spaced filter where the aforementioned process connected with the cleaning of a filter, is repeated.

As seen in FIG. 1, the recycling blower 12 can be used to backflush the filters 20-26 with ambient air which is drawn into the filters and carries the zinc powder from the filters, through the pipes, and out the fluid outlet 60 which is in communication with the apparatus 5, as shown in FIG. 1. Gas escaping from the chamber 18 through the annular opening 57 between the first and fourth pipes 58, 55 helps to draw air upwardly through the filters to backflush the filters.

Figure 4:
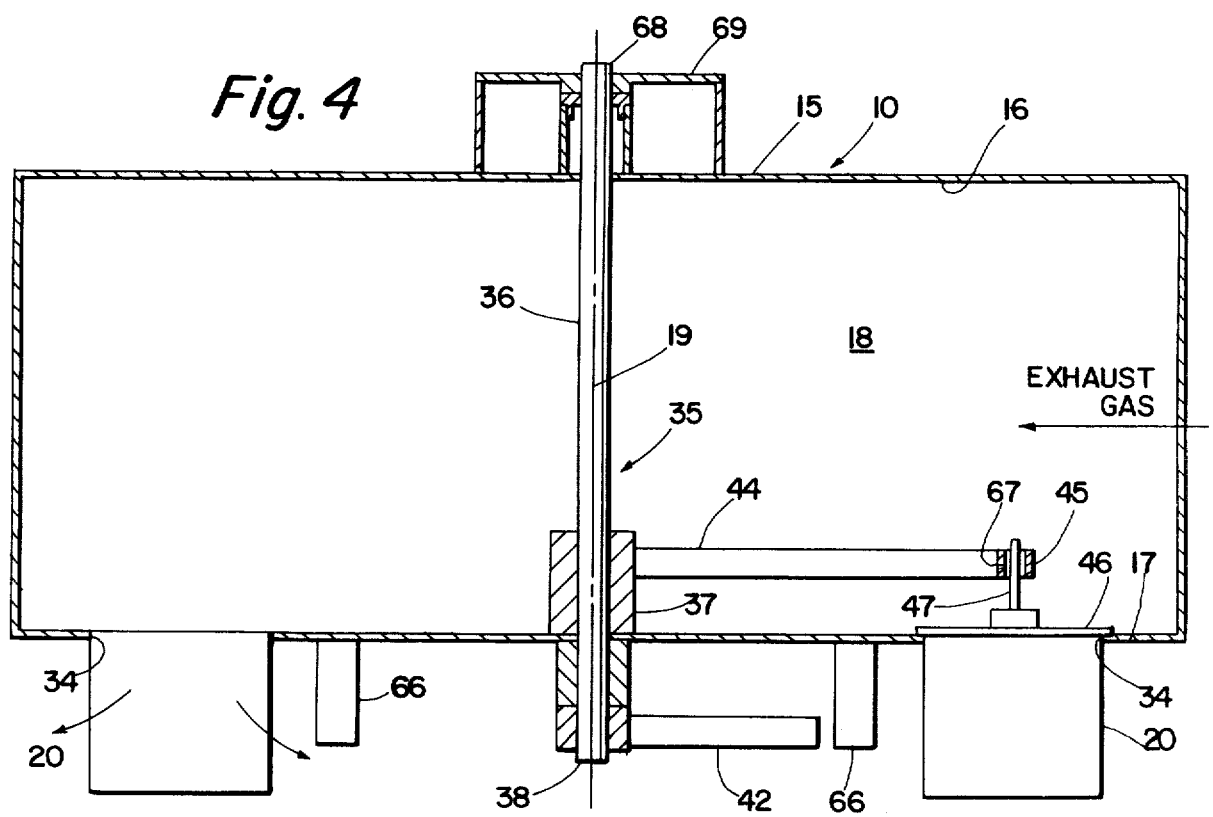
FIG. 4 is a similar section of a different embodiment of the invention.

With particular reference to FIG. 4, it can be seen that a floating bottom wall filter outlet closing device can be manually operated by an operator who rotates the handle 42 to a position where it is radially aligned with a marker 66 that is positioned adjacent each of the filters. In this way, the operator knows that the cover 46, which in this case is a solid circular plate, covers and seals the opening of the filter, so that the filter can be manually removed to a remote location for cleaning. The vertical member 47 of the cover 46 is a cylindrical pin which extends through an adjacent aligned pinhole 67 adjacent the distal end 45 of the arm 44 which, in this case, is a solid rod. Thus, the cover 46 is freely supported on the bottom wall 17 of the chamber 18. The vertically uppermost top 68 of the drive shaft 36 is rotatably mounted on a bracket 69 that is secured in upstanding relation to the top wall 16 of the housing 15.

Thus, there has been described a unique filtering device that has a floating cover for sealing the filters from the chamber in which the exhaust gas is circulated for subsequent passage through the filters. The structure of the cleaning device is simple, thereby making its operation relatively easy either, by hand, or automatically by use of a motor and sensing mechanisms for properly positioning the covers over the openings in the bottom wall of the chamber leading to the filters.

What is claimed is:

1. In combination, a filtering apparatus for separating finely powderized material from a stream of gas and filtering cleaning means, the filtering apparatus including:
   (a) a chamber sealed from the ambient atmosphere, the chamber having a fluid inlet through which gas carrying powderized material enters the chamber and a horizontal bottom wall having a substantially planar surface and a plurality of filter openings therethrough, the filter openings being disposed concentrically about a vertical, central axis;
   (b) a plurality of hollow cylinder portions each having a vertical cylinder portion axis disposed parallel and equidistant from said central axis, each hollow cylinder portion depending downward from the bottom wall surrounding one of the bottom wall filter openings; and,
   (c) a plurality of filters for separating the gas and the powderized materials, each filter being operatively connected with one of the hollow cylinder portions such that the filters are in fluid communication with the chamber for receiving gas and powderized material therefrom; and,
said filter cleaning means including:

(a) a hollow arm disposed for rotation about the central axis, the arm extending radially from the central axis and terminating in a free, distal end portion which has a vertical distal end portion axis, the distal end portion axis being displaced from the central axis by substantially the same distance as the cylinder portion axis, whereby the arm distal end portion is adapted to be rotated successively into axial alignment with each of the bottom wall filter openings;

(b) a floating cover for providing a fluid connection between the arm distal end portion and each bottom wall filter opening and for sealing the arm distal end portion and connected filter from the chamber, the floating cover including an annular flange portion which has a generally planar lower surface and a vertically disposed, annular collar portion disposed in slidable, telescopic relationship with the arm distal end portion such that the floating cover is (i) biased by gravity into sliding engagement with the chamber bottom wall, (ii) vertically moveable relative to the arm distal end portion, and (iii) horizontally slidable with the arm distal end portion into alignment with successive bottom wall filter openings; and (c) means for intermittently rotating the arm about the central axis to align the floating cover successively with each of the bottom wall filter openings and causing the floating cover to dwell in alignment with each bottom wall filter opening for a preselected duration.

2. The apparatus as set forth in claim 1 wherein the arm rotating means includes:

a drive shaft extending through the chamber bottom wall concentric with the central axis, the arm being operatively connected with the drive shaft for rotation therewith;

motor means operatively connected with the drive shaft for rotating the floating cover successively from bottom wall filter opening to bottom wall filter opening;

a sensing finger secured adjacent a protruding portion of the drive shaft in a fixed radial relationship with the arm for rotation therewith;

a plurality of contact means for sensing proximity of the sensing finger, each contact means sensing the proximity of the sensing finger concurrently with the floating cover being aligned with a corresponding one of the bottom wall filter openings; and a timer means operatively connected with the contact means and the motor means for stopping the motor means from rotating the drive shaft for said preselected duration such that the floating cover dwells in alignment with each bottom wall filter opening for the preselected duration.

3. The apparatus as set forth in claim 1 further including:

means for contacting a strip of metal, freshly coated with liquid zinc with finely powderized zinc in a gas stream;

means for removing excess gas laden with powderized zinc from the contacting means to the chamber for passage through the bottom wall filter openings and the filters to separate powderized zinc and discharge the gas into the ambient atmosphere; and, means operatively connected with the arm for returning the powderized zinc from the filters to the contacting means for reuse in contacting the strip of metal.

4. The apparatus as set forth in claim 1 wherein the arm includes a first pipe portion disposed concentric with the central axis, a second, generally horizontal arm portion extending radially from the first arm portion and a third arm portion disposed vertically and parallel to the central axis and terminating in the arm distal end portion.

5. In combination, a filtering apparatus for separating finely powderized material from a stream of gas and filtering cleaning means, which combination separates a continuous flow of gas with a lower concentration of entrained powderized material into a continuous flow of gas free of the powderized material and a continuous flow of gas with a higher concentration of entrained powderized material, the filtering apparatus including:

(a) a chamber sealed from the ambient atmosphere, the chamber having a fluid inlet through which gas carrying powderized material enters the chamber, a horizontal wall having a substantially planar surface and at least a first plurality of filter openings therethrough, the filter openings being disposed concentrically about a vertical, central axis;

(b) a stationary vertical standpipe disposed concentrically around the central axis and extending from the chamber;

(c) a plurality of hollow cylinder portions each depending from the horizontal wall surrounding one of the filter openings; and, (d) a plurality of filters for separating the gas and the powderized material, each filter being operatively connected with one of the hollow cylinder portions such that the filters are in fluid communication with the chamber for receiving gas and powderized material therefrom, the filters discharging gas free of powderized material to the atmosphere; and, said filter cleaning means including:

(a) a hollow arm disposed for rotation about the central axis, the arm including a first pipe portion telescopically received within the stationary standpipe with an annular gap defined therebetween such that the standpipe is in fluid communication with the chamber through the gap, a second pipe portion extending radially from the central axis, and a distal end pipe portion, the distal end pipe portion being displaced from the central axis by substantially the same distance as the filter openings, whereby the distal end pipe portion is adapted to be rotated successively into axial alignment with each of the filter openings;

(b) a floating cover for providing a fluid connection between the distal end pipe portion and each filter opening and for sealing the distal end pipe portion and connected filter from the chamber, the floating cover including a generally planar surface for sliding engagement with the chamber horizontal wall and a vertically disposed, annular collar portion disposed in slidable, telescopic relationship with the distal end pipe portion such that the floating cover is vertically moveable relative to the arm distal end portion and is horizontally slidable with the distal end pipe portion into alignment with successive filter openings;

(c) means for rotating the arm about the central axis to align the floating cover successively with each of the filter openings and causing the floating cover to dwell in alignment with each filter opening for a preselected duration; and, (d) means for drawing gas with entrained powderized material from the standpipe, whereby when the floating cover is in alignment with a filter opening, gas is drawn through the filter entraining powderized material previously separated by the filter and gas with entrained powderized material is drawn from the chamber through the gap and when the floating cover is between filter openings, gas with entrained powderized material is drawn at least from the chamber through the gap such that gas with entrained powderized material is continuously drawn through the standpipe.

6. The apparatus as set forth in claim 5 further including:

a vertical drive shaft rotatably mounted concentric with the central axis;

a tab secured to the second pipe portion and extending downward therefrom; and, a pin keyed to the vertical drive shaft for rotation therewith, the pin extending radially from the vertical drive shaft for abutting the tab to control rotational movement of the arm distal end portion and the floating cover about the central axis, whereby under excess load caused by binding, jamming, or the like, at least one of the tab and pin are adapted to yield.

7. A powderized material handling apparatus comprising:

means for coating a strip moving from an upstream end to a downstream end with the powderized material;

a source of the powderized material;

a recirculating blower having an inlet which is positioned and arranged to draw powderized material and air from the coating means and powderized material from the powderized material source and having an outlet which is positioned and arranged to provide powderized material entrained in air under pressure to the coating means;

an exhaust blower positioned and arranged for drawing air and powderized material from at least adjacent the coating means downstream end;

a filtering apparatus for separating the powderized material and the air, the filtering apparatus being in flow communication with the exhaust blower so as to receive powderized material and air from the exhaust blower and discharging air to the atmosphere, the filtering apparatus including:

(a) a housing defining a chamber sealed from the ambient atmosphere, the housing having a fluid inlet for receiving air and powderized material from the exhaust blower and a horizontally disposed, generally planar bottom wall having a plurality of filter openings therein disposed around a vertical, central axis;

(b) plurality of filters operatively connected with the bottom wall filter openings for receiving air and powderized material therefrom, each filter passing air and retaining the powderized material;

means for successively backflushing each filter with air to remove the powderized material therefrom and provide a substantially continuous return of powderized material entrained in air to the recirculating blower inlet, the filter backflushing means including:

(a) a stationary, hollow standpipe fixedly mounted through the housing with an inner end portion in a vertical, concentric relationship with the central axis, the standpipe being operatively connected with the recirculating blower inlet;

(b) a first hollow pipe portion disposed in concentric arrangement the central axis and in a telescopic relationship with the stationary hollow standpipe such that the first pipe portion is in fluid communication with the standpipe and rotatable relative thereto;

(c) a distal hollow pipe end portion disposed in a vertical, parallel relationship with the central axis, the distal end portion and the first pipe portion being disposed in communication such that fluid drawn through the distal end portion is discharged through the stationary standpipe, the distal end portion being connected with the first pipe portion for rotation therewith such that the distal end portion is disposable in alignment successively with each bottom wall filter opening as the first pipe portion is rotated about the central axis;

(d) a floating cover for selectively providing fluid communication between the distal end portion and each bottom wall filter opening, the floating cover having an annular flange with a substantially planar bottom surface which is disposed for sliding engagement along the bottom wall and having a vertically disposed cylindrical collar connected with the annular flange and disposed in a telescopic, vertically slidable relationship with the distal end portion, whereby the floating cover is adapted to slide over powderized material which may become deposited on the bottom wall and is biased toward engagement with the bottom wall surrounding each filter opening by gravity and by a pressure differential between the housing chamber and the distal end portion; and, (e) means for rotating the first hollow pipe portion to align the floating cover successively with each bottom wall filter opening.

8. The apparatus as set forth in claim 7 wherein the rotating means includes;

(a) a drive shaft vertically disposed along said vertical axis and operatively connected with the first pipe portion for transmitting rotational force thereto;

(b) motor means operatively connected with the drive shaft for providing motive power thereto;

(c) means for sensing positioning of the floating collar substantially in alignment with each of the bottom wall filter openings; and, (d) timing means operatively connected with the motor means for stopping rotation of the drive shaft for a preselected period of time sufficient to backflush the filter, whereby the floating cover is moved intermittently and dwells for the preselected time period in alignment with each bottom wall filter opening.

9. The apparatus as set forth in claim 8 wherein the sensing positioning means includes:

a sensing finger operatively connected with the drive shaft below the bottom wall for rotation therewith;

a plurality of electrical contact means for sensing proximity of the sensing finger, each contact means corresponding to one of the bottom wall filter openings, the contact means being disposed such that the sensing finger moves into the sensed proximity thereto when the floating cover is disposed in alignment with the corresponding bottom wall filter opening, the contact means being operatively connected with the timing means for stopping the rotation of the drive shaft for the predetermined time period.

10. The apparatus as set forth in claim 8 wherein the strip is a strip of metal freshly coated with liquid zinc and wherein the powderized material is finely powdered zinc.

* * * * *